US007444317B2

(12) United States Patent
Pudipeddi et al.

(10) Patent No.: US 7,444,317 B2
(45) Date of Patent: Oct. 28, 2008

(54) SYSTEM AND METHOD FOR MANAGING FILE NAMES FOR FILE SYSTEM FILTER DRIVERS

(75) Inventors: Ravisankar Pudipeddi, Sammamish, WA (US); Eileen C. Brown, Seattle, WA (US); Neal R. Christiansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 10/187,119

(22) Filed: Jun. 28, 2002

(65) Prior Publication Data

US 2004/0002942 A1 Jan. 1, 2004

(51) Int. Cl.
*G06F 17/30* (2006.01)
(52) U.S. Cl. .............................. 707/1; 709/224; 718/102
(58) Field of Classification Search .............. 707/104.1, 707/1; 710/8; 709/224; 718/102
See application file for complete search history.

(56) References Cited

U.S. PATENT DOCUMENTS

| 5,748,980 | A | * | 5/1998 | Lipe et al. ...................... 710/8 |
| 5,909,559 | A | * | 6/1999 | So .............................. 710/307 |
| 6,026,402 | A | * | 2/2000 | Vossen et al. .................. 707/9 |
| 6,092,163 | A | * | 7/2000 | Kyler et al. ................. 711/163 |
| 6,105,119 | A | * | 8/2000 | Kerr et al. ................... 711/219 |
| 6,148,336 | A | * | 11/2000 | Thomas et al. .............. 709/224 |
| 6,286,013 | B1 |   | 9/2001 | Reynolds et al. ............ 707/200 |
| 6,330,573 | B1 |   | 12/2001 | Salisbury et al. ............ 707/511 |
| 6,389,427 | B1 | * | 5/2002 | Faulkner .................. 707/104.1 |
| 6,389,459 | B1 | * | 5/2002 | McDowell ................... 709/216 |
| 6,393,517 | B1 | * | 5/2002 | Oliver et al. ................. 711/112 |
| 6,460,048 | B1 |   | 10/2002 | Teng et al. ............. 707/103 R |
| 6,574,618 | B2 | * | 6/2003 | Eylon et al. ..................... 707/1 |
| 6,647,473 | B1 | * | 11/2003 | Golds et al. ................. 711/161 |
| 6,654,888 | B1 | * | 11/2003 | Cooper et al. ............... 713/190 |
| 6,769,071 | B1 | * | 7/2004 | Cheng et al. .................... 714/4 |
| 6,802,021 | B1 | * | 10/2004 | Cheng et al. .................... 714/4 |
| 7,150,018 | B2 | * | 12/2006 | Golds et al. ................. 718/102 |
| 2001/0020245 | A1 |   | 9/2001 | Golds et al. ................. 709/102 |

* cited by examiner

*Primary Examiner*—Don Wong
*Assistant Examiner*—Sheree N Brown
(74) *Attorney, Agent, or Firm*—Merchant & Gould; Ryan T. Grace

(57) ABSTRACT

Described is a method and system that manages filenames for filter drivers in a file system. The present invention includes a filter manager that handles filename queries from the filter drivers. The filter manager returns a pointer to the requesting filter driver that points to a filename information structure corresponding to the type of filename requested. The filter manager also manages a cache of filename information structures that include information that can be shared among the various filter drivers, amortizing the filename queries for filter drivers. The caching functionality of the filter manager increases the efficiency and reduces the overhead of filename queries within the file system by reducing the number of filename operations required for a file system filter driver to retrieve a desired portion of the filename.

22 Claims, 12 Drawing Sheets

EXEMPLARY FILENAME

SYSTEM AND METHOD FOR MANAGING FILE NAMES FOR FILE SYSTEM FILTER DRIVERS

BACKGROUND OF THE INVENTION

File System Drivers (FSDs) manage file system formats. Although FSDs run in kernel mode, they differ in a number of ways from standard kernel-mode drivers. The most significant is that each FSD registers itself as a file system driver with the operating system. A filter driver that layers over a file system driver is called a file system filter driver. A file system filter driver includes the ability to view file system requests and optionally modify or complete the requests. File system filter drivers can include filter drivers for performing encryption, virus detection, and other operations.

Filename retrieval and formatting is commonly a large portion of the code implemented in a file system filter driver. File systems (e.g., NTFS, FAT, etc. . . . ) may vary in the size of filename that is allowed. For example, an NT file system sets the name specification such that each component in a file name path is limited to 255 characters and the total file name length is limited to 65536 characters. Filenames can contain Unicode characters as well as multiple periods and embedded spaces. However, certain file systems are limited to 8 (non-Unicode) characters for its filenames, followed by a period and a 3-character extension, commonly referred to as the "8.3" format. As a consequence, certain applications originally written for these files systems are still limited to understanding 8.3 format or compatible filenames. In other file systems, such as NTFS, the file system generates an alternate 8.3 format short name for a file created with a long name when the short name is requested by an application. A long name corresponds to filenames longer than the 8.3 format, those containing Unicode characters, those with multiple period characters or a beginning period, and those with embedded spaces. The short name is a fully functional alias for a file and is stored in the same directory as the long name. Either name may be used to open, read from, write to, or copy the file.

Other formats exist for filenames, and file system filter drivers may initiate queries for filenames in any one of these formats. Filenames are commonly used by file system filter drivers to control what action should be taken during I/O operations. A user or application can specify a filename in one of the many different formats. In certain cases, the file system filter driver normalizes the file name to a standard format to examine the filename for pertinence to its operations. File system filter drivers also commonly parse a filename into fragments. For example, a file system filter driver providing virus detection may be most interested in the type of extension of the filename (e.g., .exe, .dll, etc. . . . ), and wish to parse the extension from the filename. Currently, multiple filter drivers may attach themselves to one FSD, and each filter driver consumes resources by querying the FSD for the filename. Each file system filter driver includes code, and dedicates process time, to manage and manipulate filenames to achieve their functions.

SUMMARY OF THE INVENTION

In accordance with the present invention, a system and method for managing file names for file system filter drivers is provided. The present invention includes a file system filter manager (hereinafter: filter manager) for handling and amortizing filename operations for file system filter drivers (hereinafter: filter drivers). The filter manager provides common file name retrieval and formatting functionality to each filter driver. In addition, the filter manager provides for caching name information that may be shared among one or more filter drivers. The caching, filename retrieval, and formatting functionality increase the efficiency of managing filenames within the file system by consolidating filename management within the filter manager.

The present invention manages filenames for filter drivers in a file system. The present invention includes a filter manager that handles filename queries from the filter drivers. The filter manager receives and handles filename requests from filter drivers located in a driver stack. The filter manager maintains a cache of filename information structures for previously generated filenames. Each filename information structure includes a pointer list that includes pointers to fragments of a filename. The filter manager first examines the cache to determine if a filename information structure was previously generated that corresponds to the filename request by filter driver. If no such filename information structure exists, the filter manager calls the provider of the filename for the filename. Once a filename information structure has been created, the filter manager updates a reference count and time stamp associated with the filename information structure. The reference count ensures that the filename information structure remains valid as long as the filename information structure is in use by at least one filter driver. The time stamp ensures that when a file is renamed, or other subsequent operations affect the filename, the file information structure reflects the current filename for the file. The filter manager then returns to the requesting filter driver a pointer to the corresponding filename information structure.

DETAILED DESCRIPTION OF THE PREFERRED EMBODIMENT

Briefly stated, the present invention is related to a method and system that manages filenames for filter drivers in a file system. The present invention includes a filter manager that handles filename queries from the filter drivers. The filter manager returns to the requesting filter driver a pointer that points to a filename information structure corresponding to the type of filename requested. The filter manager also manages a cache of filename information structures that include information that can be shared among the various filter drivers, amortizing the filename queries for filter drivers. The caching functionality of the filter manager increases the efficiency and reduces the overhead of filename queries within the file system by reducing the number of filename operations required for a file system filter driver to retrieve a desired portion of the filename.

Throughout the specification and claims, the following terms take the meanings explicitly associated herein, unless the context clearly dictates otherwise.

The terms "File Information Structure" or "FIS" refers to a data structure associated with the filter manager that, in at least one embodiment, stores pointers to name fragments of a particular filename stored on the volume. The term "name fragment" refers to a portion of the filename. For example, the filename typically includes an extension (e.g., .txt, .dll, .doc, etc. . . . ). The extension represents one type of a name fragment.

The term "altitude" refers to the order of a particular filter driver with respect to responding to Input/Output Request Packets (IRPs) sent between an application and the file system that manages the volume. Filter drivers with a higher altitude are referred to as being "further away" from the file system, handling operations associated with the IRP earlier in comparison to other filter drivers when the IRP is sent from an application. Correspondingly, the filter driver is lower in altitude when it handles operations associated with an IRP earlier in comparison to other filter drivers when the IRP is sent from the file system. IRPs are often referred to as a data structure used in the IO subsystem, including the file systems such as NTFS. However, even though only the IRP may be referenced, it is appreciated that the filter manager of the present invention may convert the IRP to another data structure, such as a Callback Data structure for presenting a given operation to a filter.

The term "filename provider" corresponds to either the file system or a particular filter driver registered to provide an alternative filename for a file.

Illustrative Operating Environment

Figure 1:
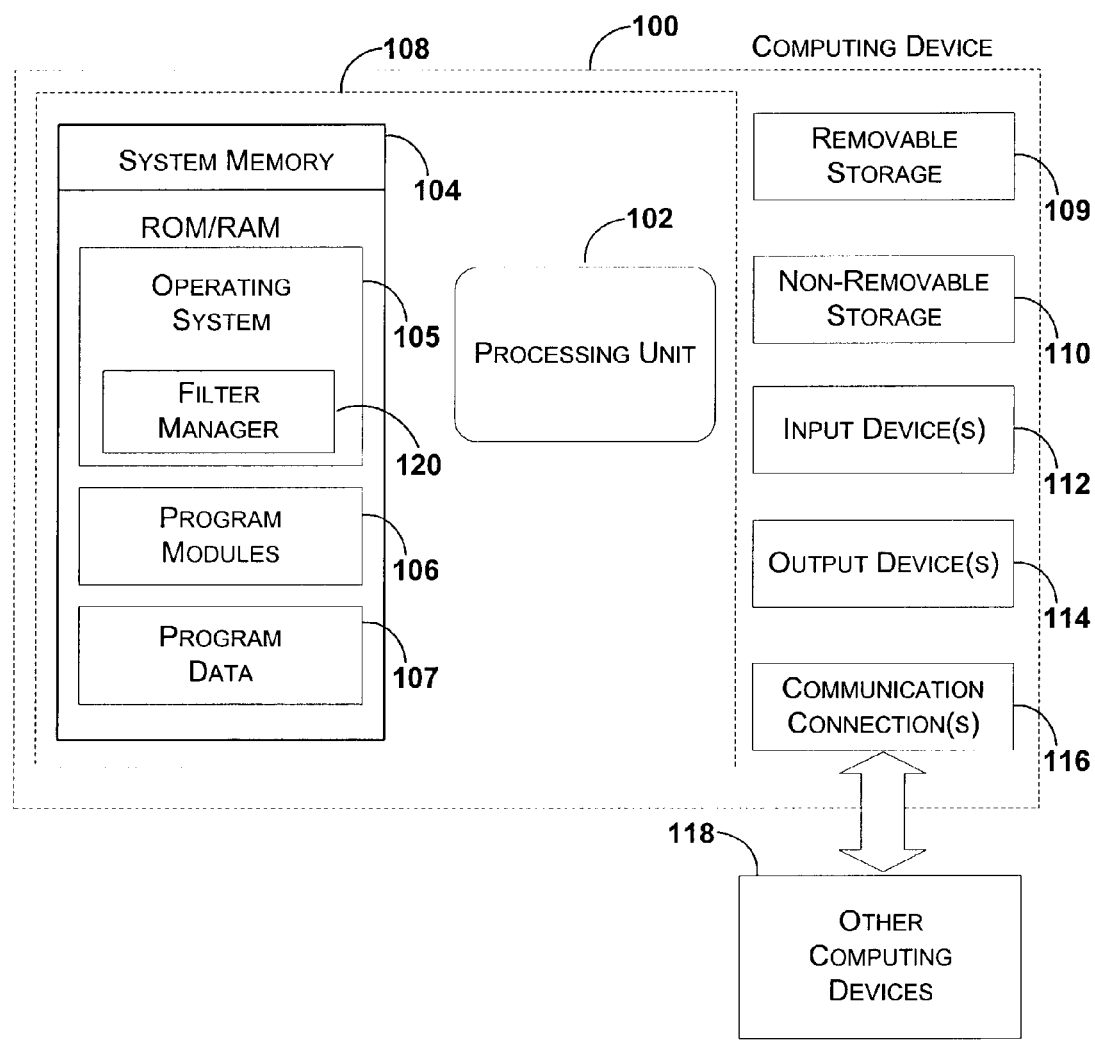
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. The operating system 105 can further include a filter manager 120 according to the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Filter Driver Structure and File System

Figure 2:
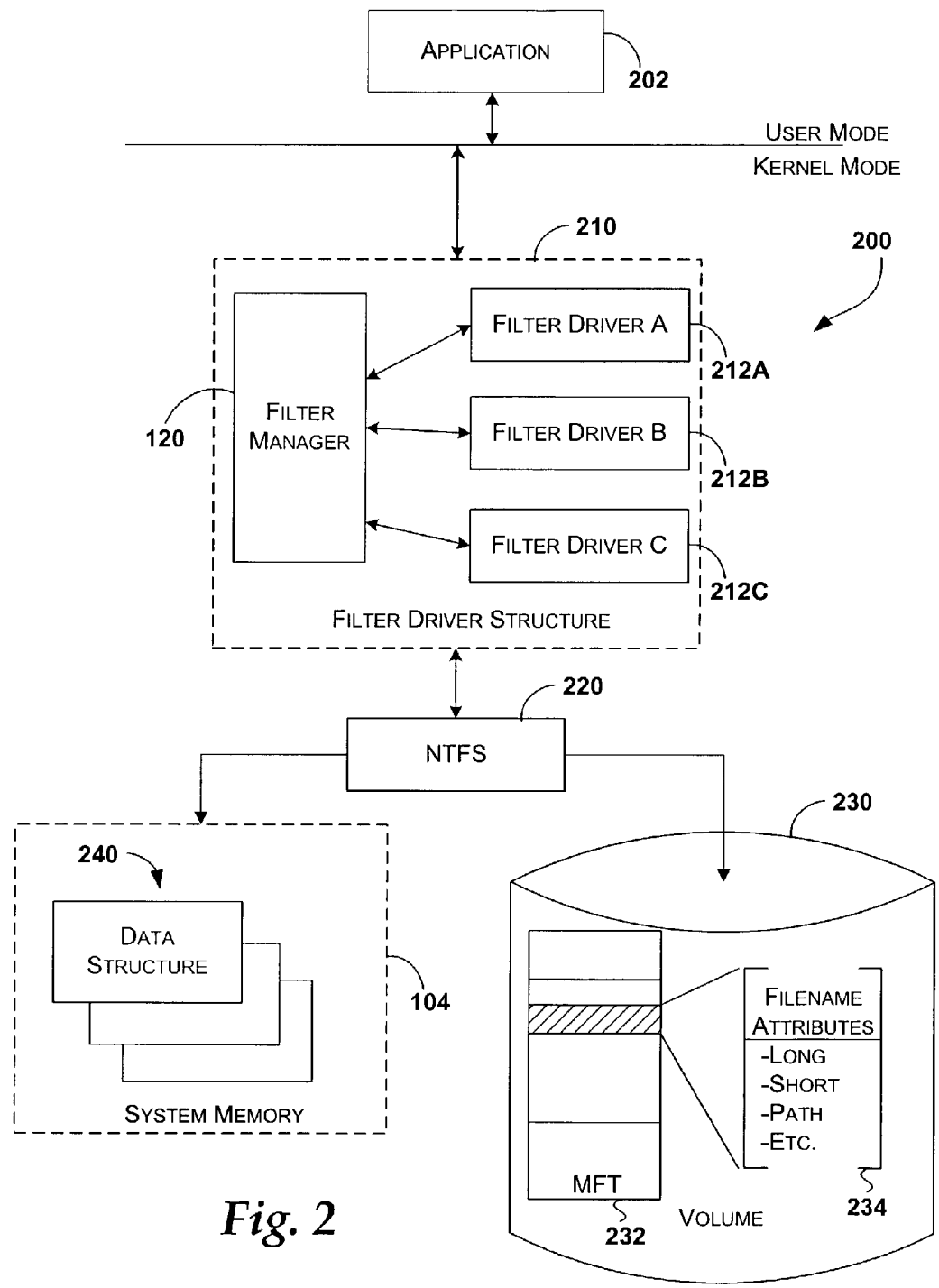
FIG. 2 is a block diagram illustrating an exemplary environment for practicing the present invention.

FIG. 2 is a block diagram illustrating an exemplary environment for practicing the present invention. The exemplary environment shown in FIG. 2 is an Input/Output (IO) subsystem environment 200 for a file system that includes a filter manager 120 according to the present invention.

File system environment 200, includes application 202 operating in user mode and NTFS file system 220 operating in kernel mode. Although described here in the context of NTFS, it will be appreciated that the present invention has equal applicability with many other file systems, such as FAT, FAT32, EXT2, HPFS, and others.

Between NTFS 220 and application 202 is filter driver structure 210 operating in kernel mode. Filter driver structure 210 includes filter manager 120 and a filter driver stack comprised of multiple filter drivers (e.g., 212A-C). NTFS 220 maintains multiple data structures (e.g., 240) within system memory 104 for managing the file system structure stored on volume 230. The data structures 240 are described in greater detail below in conjunctions with FIG. 3. Volume 230 includes Master File Table (MFT) 232 which provides an array of file records that contain one record for each file on volume 232, including a record for MFT 232 itself. For example, MFT 232 can include a record of filename attributes 234, and a pointer to other file records that contain additional filename attributes 234.

In IO subsystem environment 200, filter drivers 212A-C add functionality to the NTFS file system 220. In previous systems, the filter drivers 212A-C intercept input/output request packets (IRPs) sent between NTFS 220 operating in kernel mode and application 202 operating in user mode. For example, an application accesses a file by calling a function to create the file (e.g., CreateFile). In response, an input/output request packet (IRP) of a specified type is generated. The IRP causes to be created a file object that stores the name of the file being opened, and the IRP is then passed to the filter structure 210. Each filter driver 212A-C may look up the filename to which the IRP refers in order to implement its specified functionality. A handle is then propagated back through the calling chain, reaching application 202 as a return parameter.

Certain filter driver's functionality depends on knowing the filename of the file associated with the IRP when the IRP is received by the filter driver. For example, a filter driver for virus detection may concentrate on files with an ".exe" or ".dll" extension within their filename. Alternatively, a filter driver directed to encryption may focus on encrypting files of a particular path. The IRP may not include the full filename of the file associated with the IRP. For example, a read, write, or create function call from application 202 may designate a file's file ID rather than the filename. The file ID is a number that uniquely identifies each file on volume 230. The filename or ID used to identify the file by the user for a CREATE or OPEN operation is valid during the pre-CREATE interval for the file. After the CREATE or OPEN operation, the file object contains data structures that allow NTFS 220 to identify which file is being reference without using the file's filename. Accordingly, if a filter driver (e.g., 212A-C) needs a filename after the pre-CREATE interval, it queries NTFS 220 for the file name. Filter drivers 212A-C may be required to initiate a number of queries to NTFS 220 for the filename to complete their operations.

In the present invention, rather than the IRP being passed serially through the filter driver stack (i.e., filter drivers 212A-C) the IRP is instead passed directly to filter manager 120. Filter manager 120 then notifies each filter driver 212A-C of the IRP so that filter drivers that include functionality related to that IRP may interact with filter manager 120 (e.g., via callbacks). One way in which filter drivers 212A-C may interact with filter manager 120 is by queries to filter manager 120 for filenames in order to complete their specified operations. Filter manager 120 manages each request by filter drivers 212A-C for filenames.

Filter manager 120 allows queries for filenames in one of three formats: Normalized, Short, or Opened. The Normalized filename has short names expanded (i.e., normalized filenames are long names), the full path of the file from the root of the directory, and mount points are resolved (see discussion of FIG. 10). The Opened filename includes the file name in the format used to open the file (e.g., may include either short names or long names). The Short filename includes only the final component of the file's full path in 8.3 format (e.g., "filename.ext").

Filter manager 120 may not allow queries for certain filename formats at particular times during the process. For example, when a create file operation (i.e., open file operation) is initiated by application 202, until the operation reaches NTFS 220, it may not be possible to determine whether the filename for the newly created file is valid. During this interval, filter manager 120 may not allow a query for a filename in a short filename format, since validity of the short filename format is in question.

Figure 3:
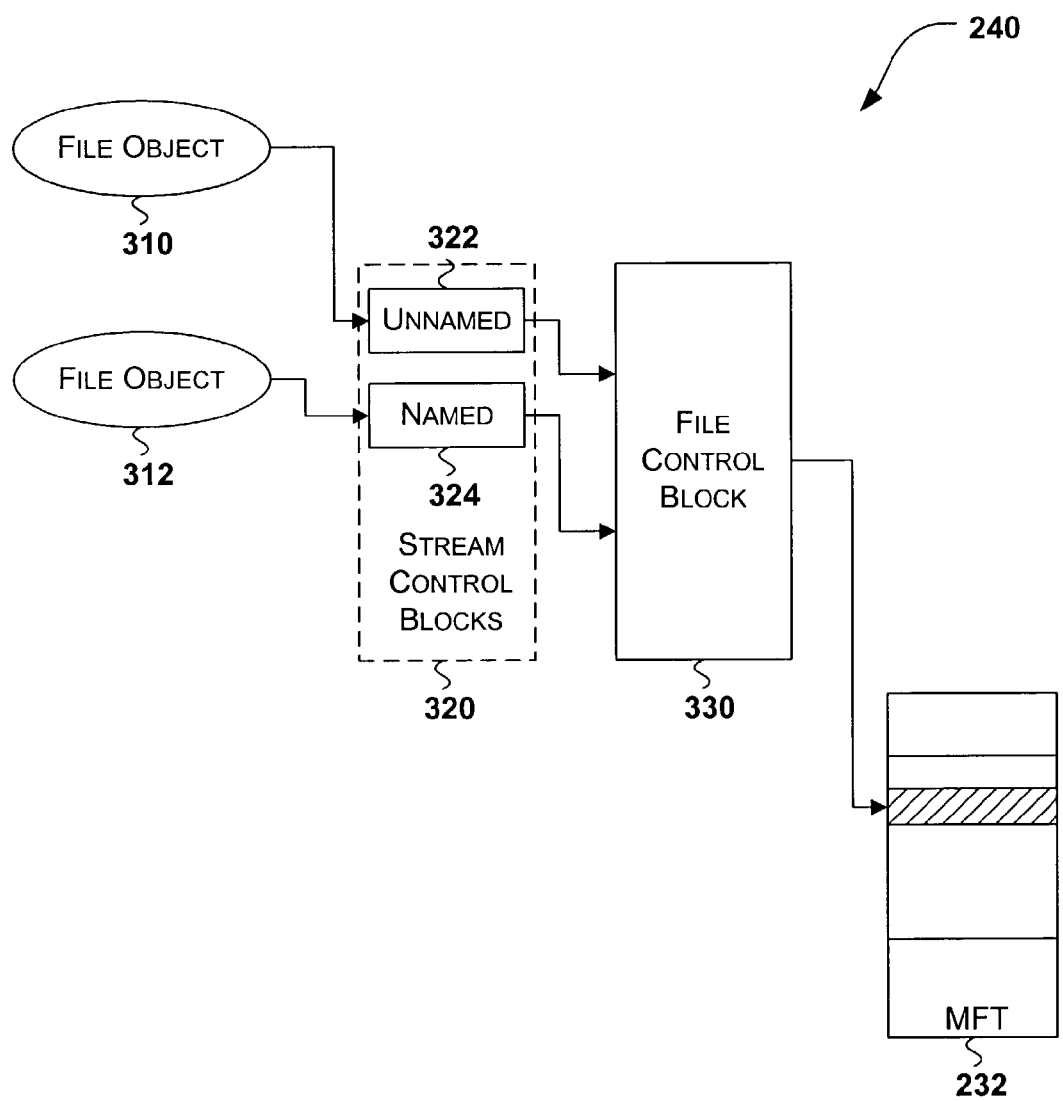
FIG. 3 illustrates an exemplary block diagram for data structures of a NTFS file system in accordance with the present invention.

FIG. 3 illustrates an exemplary block diagram of data structures 240 that are maintained by an NTFS file system in accordance with the present invention. The data structures 240 include file objects 310 and 312, stream control blocks (SCBs) 320, and file control block (FCB) 330.

A file may be composed of one or more data streams of which the primary data stream is unnamed. The file system uses an SCB (e.g., 322 and 324) to uniquely identify each data stream for a file. For example, SCB 322 is the primary, unnamed stream for one of the file objects (e.g., 310) shown, and SCB 324 is the secondary, named stream for the file object. A file object (310, 312) corresponds to an open of a specific data stream (named or unnamed) of a file. The file system creates several pointers to get from a file object (310, 312) to the location of a file on a volume that is presented by Master File Table (MFT) 232. File objects 310 and 312, each representing a single instance of an open file, point to stream control blocks (SCBs) 320 corresponding to the file to which the caller application is trying to read or write. SCBs for a particular file point to a common file control block (e.g., 330). FCB 330 contains a pointer to the file's record in MFT 232.

Figure 4:
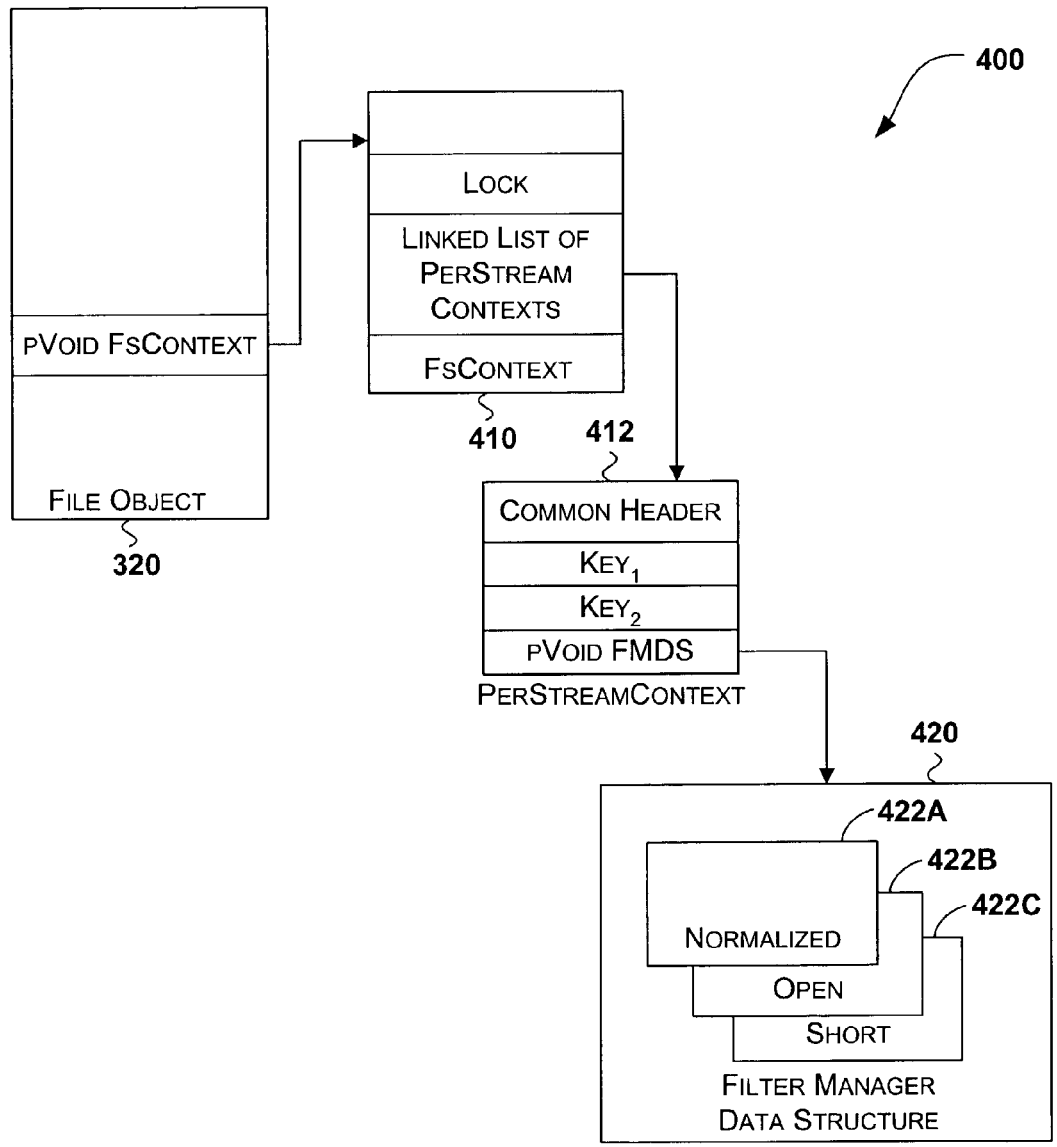
FIG. 4 shows an exemplary block diagram of the association between a file object and a filter manager data structure in accordance with the present invention.

FIG. 4 shows an exemplary block diagram of the association between a file object and a filter manager data structure in accordance with the present invention. As described with relation to FIG. 3, a file object 320 represents an open instance of a file. Certain types of drivers, such as filter drivers, may utilize some of the fields within the file objects 320. The present invention utilizes a field within file object 320 for a pointer. The pointer (Pvoid FsContext) points to a data structure referred to as an FsContext common header 410 that includes a lock, and a linked list of perstream contexts. The FsContext common header 410 designates whether the file system supports "per stream context" functionality. "Per stream context" refers to whether the file system (as in an NTFS file system) supports allowing other drivers to associate some information with this stream. FsContext common header 410 also provides a linked list of per stream contexts that may be populated by a filter driver with information for specified functionality. FsContext common header 410 may be either a file control block (FCB) or a stream control block (SCB) depending on the file system. In the present invention, with the NTFS file system, FsContext common header 410 is an SCB that includes a linked list of per stream contexts for providing a context for the file objects (e.g., 320). Each per stream context 412 includes two keys ($Key_1$, $Key_2$) and a pointer (pVoid FMDS) to a filter manager data structure 420 maintained by the filter manager (see FIG. 2). The filter manager data structure 420 is a cache for storing a filename information structure (FIS) (See FIG. 5) for each filename created in response to a request by a filter driver. Each filter manager data structure 420 is further organized into name caching data structures 422A-C according to the format of the filename associated with each FIS (e.g., normalized names, opened names, and short names).

Figure 5:
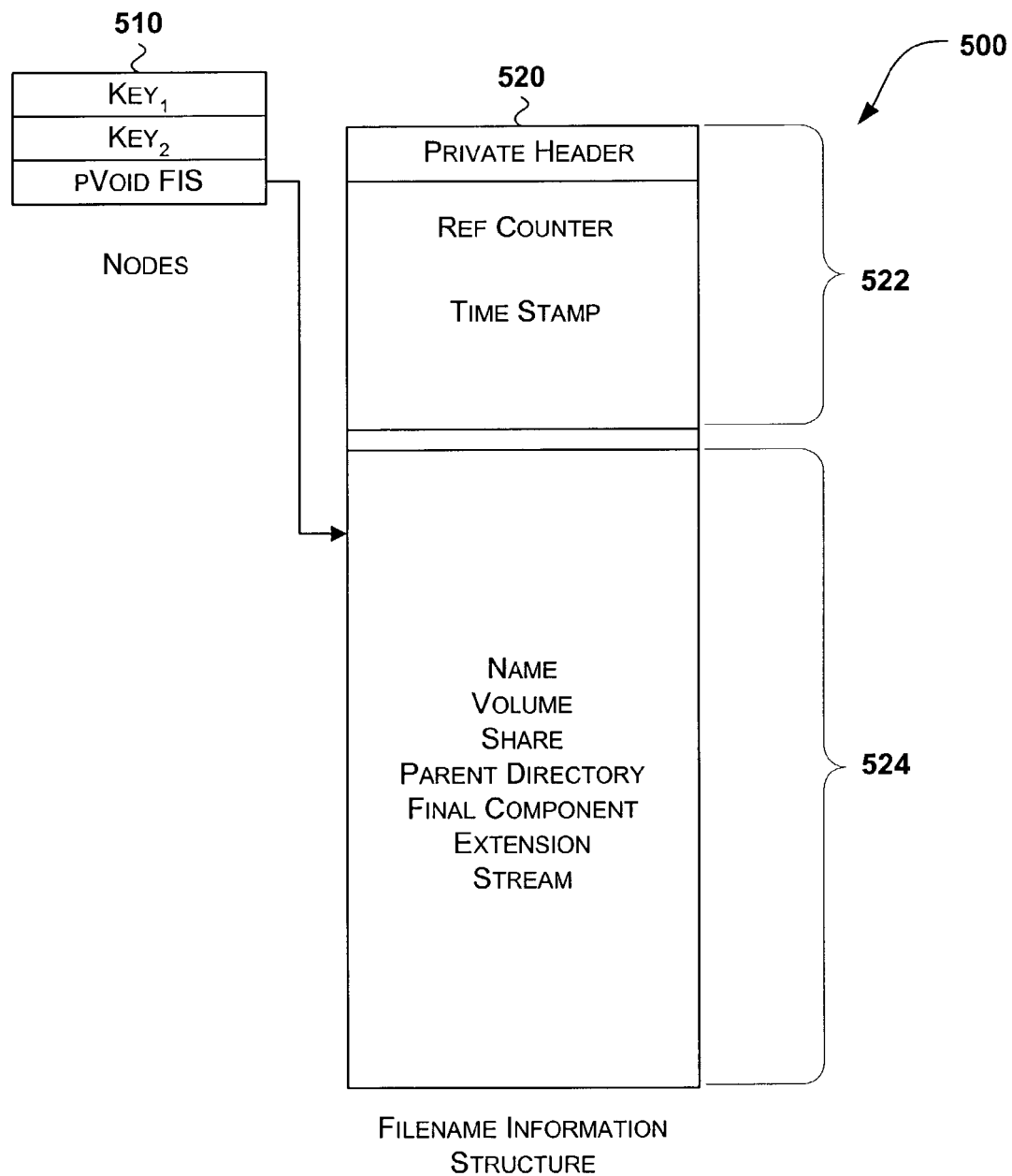
FIG. 5 illustrates an exemplary block diagram of further data structures associated with the filter manager in accordance with the present invention.

FIG. 5 illustrates an exemplary block diagram of further data structures associated with the filter manager in accordance with the present invention. Each name caching data structure 422A-C shown in FIG. 4 includes a tree structure. In one embodiment, the tree structure is a splay tree structure. A splay tree is commonly used in connection with placing and locating files in a database.

In the present invention, a node 510 of the tree structure may point to a particular FIS 520. The nodes 510 are indexed by two keys ($Key_1$, $Key_2$) and include a pointer (pVoid FIS) that points to the appropriate FIS corresponding to a filename. As described in connection with FIG. 8, for the present invention, $Key_1$, corresponds to the file object of the filename requested, and $Key_2$ corresponds to the filename provider of the filename.

Filename Information Structure (FIS) 520 includes private header 522 and filename pointer list 524. There may be a different FIS 520 for each type of a particular filename: Normalized, Opened, or Short. In other words, the normalized filename for a particular file and the short filename for the same file, are each represented by a different FIS 520.

Private header 522 includes data regarding a reference count, a time stamp, and other data. The reference count ensures that FIS 520 is maintained in memory for as long as it is referenced by a filter driver. The time stamp ensures that when a file is renamed, or other subsequent operations affect the filename, FIS 520 reflects the current filename for the file. The time stamp is explained in greater detail with reference to FIG. 10 below.

Filename pointer list 524 includes pointers to specified fragments of the same filename located in a single buffer of memory. Each fragment corresponds to a Unicode string that makes up a portion of the name (see FIG. 6). The pointers operate as indexes to an array of characters that comprises the filename. The name is parsed by the filter manager such that filter drivers that desire to examine a fragment of the filename avoid having to parse the filename individually.

Figure 6:
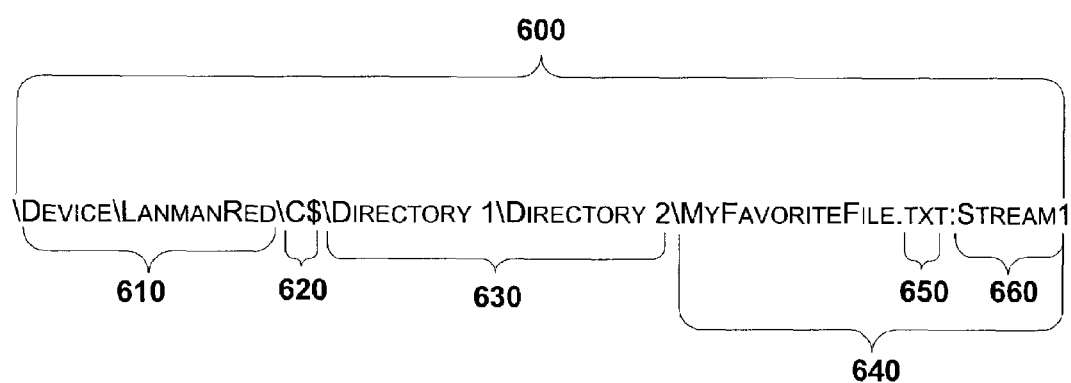
FIG. 6 shows an exemplary filename with its corresponding fragments labeled in accordance with the present invention.

FIG. 6 shows an exemplary filename with its corresponding fragments labeled in accordance with the present invention. In this implementation, the filename 600 includes six fragments (610, 620, 630, 640, 650, 660) recognized by the filter manager (see FIG. 2) that may be provided upon request. Each fragment is pointed to by one of the pointers of filename pointer list 524 shown in FIG. 5. The fragments include: Volume 610, Share 620, ParentDir 630, FinalComponent 640, Extension 650, and Stream 660.

Volume 610 refers to the portion of the filename that describes the logical volume that stores the file. For a file across a network, Volume 610 is the portion of the filename that describes the network provider used to access the remote file (e.g., \Device\LanmanRed\).

Share 620 is a NULL string for local files. However, for remote files, Share 630 corresponds to the portion of the name that describes the path that stores the name in a network provider's name space.

ParentDir 630 is the portion of the filename that describes the full path of the filename with the final component removed.

Whereas each component of the filename is separated by a "/", or a "\" FinalComponent 640 is the component furthest to the end of the name string including the stream.

Extension 650 is the portion of the filename from the last "." to any stream.

Stream 660 is the portion of the filename from the first ":" in the final component.

In one embodiment, certain fragments may not be available for files opened according to certain name types (e.g., short names) due to the overhead cost associated with obtaining that particular fragment.

Processes for Formatting, Parsing, and Caching

Figure 7:
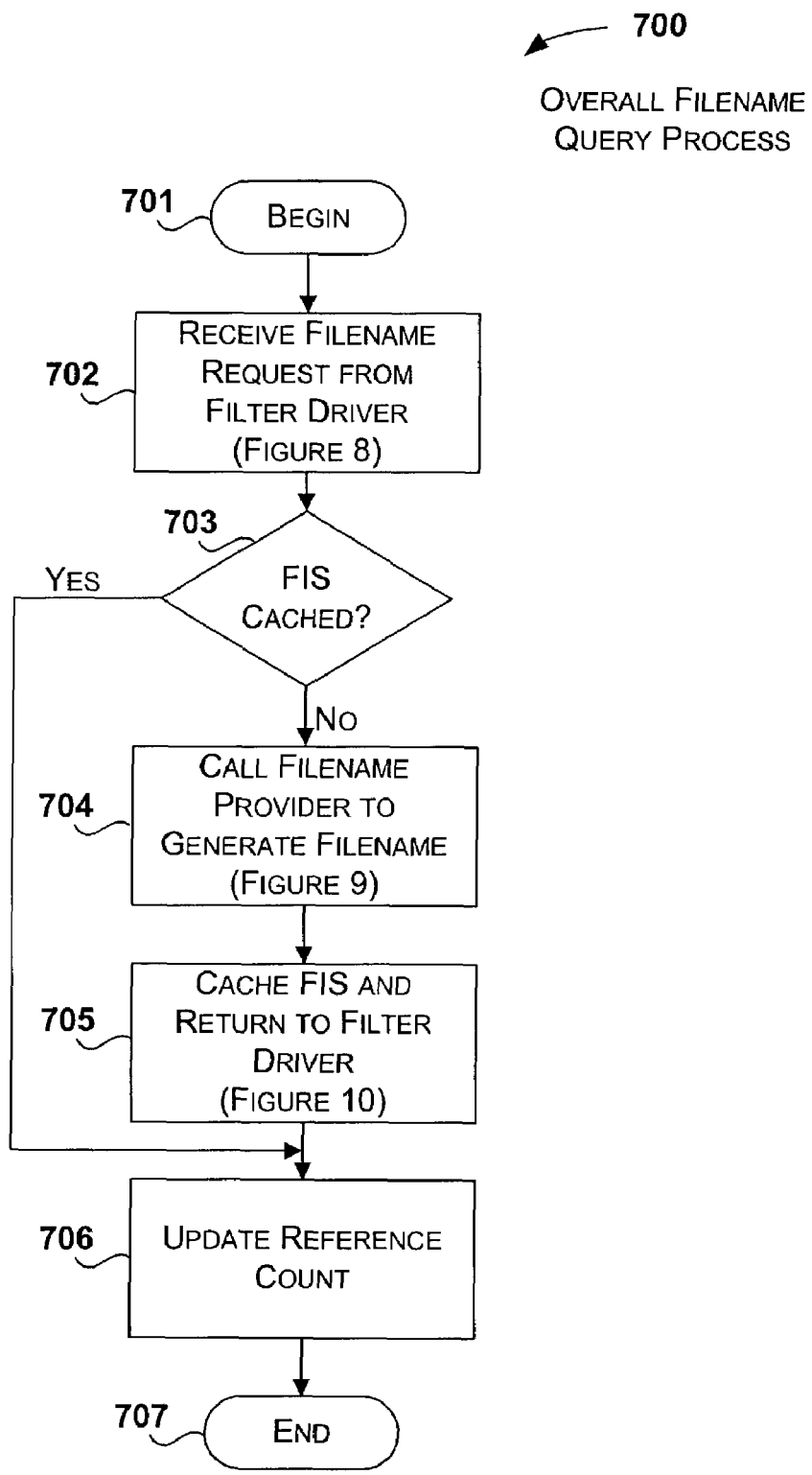
FIG. 7 is a logical flow diagram of an exemplary overview of the filename query process performed in accordance with the present invention.

FIG. 7 is a logical flow diagram generally illustrating the filename query process performed in accordance with the present invention. The process enters at starting block 701, where an IRP has been received by filter manager 120 shown in FIG. 2 and one of filter drivers 212A-C has been notified of the IRP. The process 700 continues at block 702.

At block 702, the filter manager receives a request from the filter driver for a particular filename. In one embodiment, the filename request is related to the IRP received by the filter manager. In another embodiment, the filter driver may initiate a name request as part of an operation unrelated to the IRP. When the filename request is received by the filter manager, the filter manager retrieves the filename. An exemplary filename request handling process is described in more detail in the discussion accompanying FIG. 8 below. Processing continues at decision block 703.

At decision block 703, a determination is made whether the FIS corresponding to the filename has been previously cached within the data structures (see FIGS. 4 and 5) corresponding to the filter manager. If the FIS corresponding to the filename request has been previously cached, processing jumps to block 706. If the FIS corresponding to the filename request has not been previously cached, processing continues at block 704.

At block 704, a call for the filename is made to the filename provider by the filter manager. The filename provider for a particular filter driver may be different for the same physical file located on the volume. A filter driver operating as a filename provider provides the filename for the filter drivers higher in altitude but generally not for filter drivers lower in altitude. For example, a first filter driver may be higher in altitude than second filter driver that is operating as a filename provider. The filename provider for the first filter driver is the second filter driver. However, if a third filter driver is lower in altitude than the second filter driver, the second filter driver is not the filename provider for the third filter driver. An exemplary process for calling the filename provider for the filename is described in more detail in the discussion accompanying FIG. 9 below. Processing continues at block 705.

At block 705, the FIS for the filename generated by the filename provider is cached within the data structure provided by the filter manager and returned to the requesting filter driver. The handling of the cache for the filter manager depends on the processes currently being applied to the filename, as well as the type of filename and other factors. A pointer to the FIS is returned by the filter manager to the filter driver that initiated the filename request. The pointer allows the filter driver to access a name fragment by accessing the filename pointer list of the FIS. An exemplary process for caching an FIS and returning it to the requesting filter driver is described in greater detail in the discussion accompanying FIG. 10 below. Processing continues at block 706.

At block 706, a reference count associated with each FIS is updated (or incremented) to reflect that the FIS is currently in use by a filter driver. In one embodiment, the reference count is included within a private header of each FIS as shown in FIG. 5. The memory associated with the FIS remains valid as long as the reference count remains greater than zero. When any filter driver acquires a reference to the FIS, the reference count is incremented. As each filter driver releases a reference to the FIS, the net count is decremented. When the net count reaches zero, the FIS is deleted and its memory cleared. The reference count ensures that the memory containing particular FIS and it's associated filename remains valid for at least as long as required. Processing continues at block 707, where processing ends.

In one embodiment, process 700 operates differently for a CREATE operation. For CREATE operations, the cache data structures (e.g., FISs) that are linked to the file's SCB are not yet generated since the file has not yet been opened by the file system. For filenames requested by a filter driver during a pre-CREATE, the filenames are generated by examining an operation data structure (e.g., IRP_CTRL) cache associated with the file object. If the filename cannot be generated from the operation data structure cache, the file name provider is requested to produce them (see FIG. 8), but the filename is cached in the operation data structure cache unit a post-CREATE interval is reached. A t post-CREATE, if the CRE- ATE operation was successful, the cache data structures are generated. The filename is cached if it is valid (see FIG. 10) and no tunneling has occurred (see FIG. 12).

Figure 8:
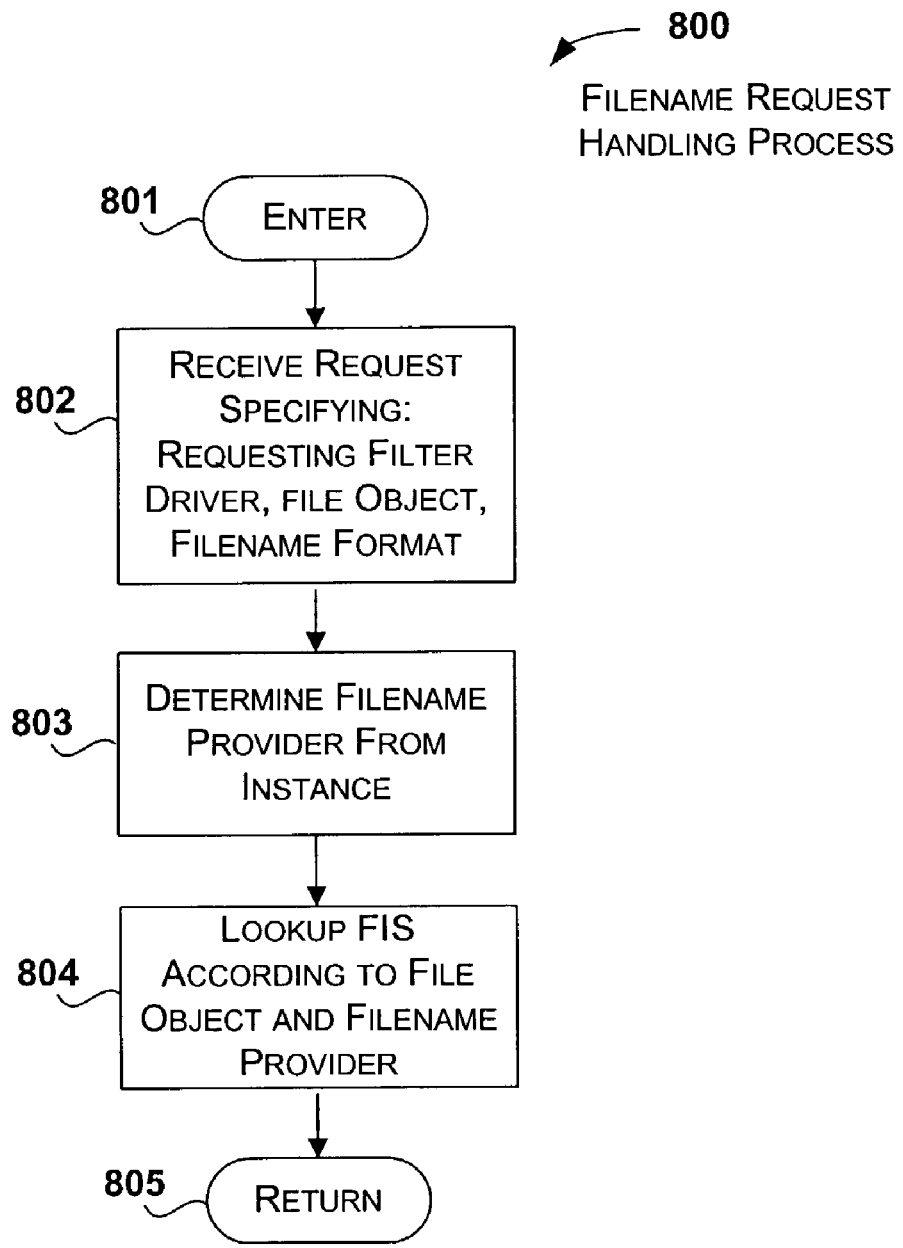
FIG. 8 is a logical flow diagram of an exemplary filename request handling process performed in accordance with the present invention.

FIG. 8 is a logical flow diagram of an exemplary filename request handling process performed in accordance with the present invention. The process enters at block 801 when process 700 shown in FIG. 7 enters block 702. Processing continues at block 802.

At block 802, the filter manager receives a request from a filter driver for a filename that includes the file object associated with the filename, and the format requested for the filename (e.g., normalized, opened, or short). Processing continues at block 803.

At block 803, the filter manager determines the filename provider from the filter driver making the filename request. As described previously, a first filter driver higher in altitude than a second filter driver that is operating as a filename provider, utilizes the second filter driver as the filename provider for its filename queries. The order of the filter drivers within the driver stack are previously determined by the filter manager. In addition, filter drivers that desire to operate as filename providers have previously registered with the filter manager. If the requesting filter driver is higher in altitude than designated filename providers, the filename provider for the instance is the filename provider closest to, but lower in altitude than the requesting filter driver. If a requesting filter driver has no other filter drivers operating as filename providers lower in altitude, than the file system operates as the filename provider for the requesting filter driver. Once the filename provider for the requesting filter driver has been determined, processing continues at block 804.

At block 804, a search is performed for an FIS corresponding to the filename request that may be already cached within the data structures provided by the filter manager. As previous stated in connection with FIG. 4, the data structures are organized according to the filename format requested (e.g., normalized, opened, short). The data structure corresponding to the filename format requested is searched according to two keys ($Key_1$, $Key_2$) (see FIG. 5). The first key is the file object associated with the particular open instance of the file. The file object assists in specifying whether the FIS is cached at the stream level or the file object level, which is discussed in greater detail in the discussion of FIG. 10. The second key is the filename provider identified at block 803. If an FIS has been previously stored, searching the filter driver data structure according to the two keys ($Key_1$, $Key_2$) locates the existing FIS. Processing continues to block 805, where processing returns to process 700 and continues at block 704 illustrated in FIG. 7.

Figure 9:
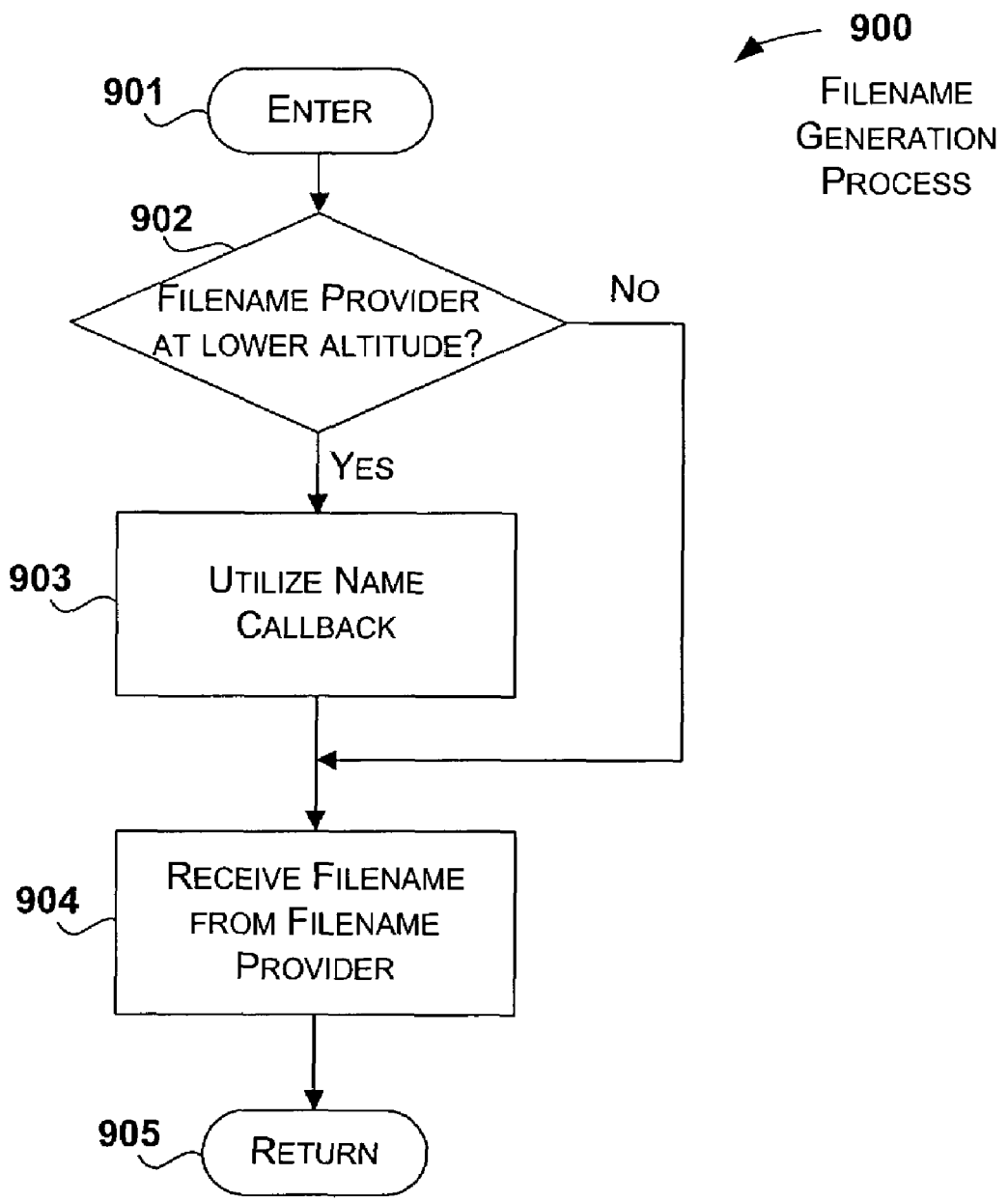
FIG. 9 is a logical flow diagram of an exemplary filename generation process performed in accordance with the present invention.

FIG. 9 is a logical flow diagram of an exemplary filename generation process performed in accordance with the present invention. The process 900 enters at block 901 when process 700 shown in FIG. 7 enters block 704. Processing continues at decision block 902.

At decision block 902, a determination is made whether a filter driver lower in altitude is operating as a filename provider. If not, the filename is provided by the file system, and processing proceeds to block 906. However, if a filter driver lower in altitude is operating as a filter driver, processing continues at block 903.

At block 903, a name callback is utilized to retrieve the filename from the filename provider. The type of callback used depends on whether a destination filename has been requested by the requesting filter driver. The filename provider registers two callbacks. One callback, CreateDestinationNameCallback is called when a destination name is requested by a filter driver higher than the filename provider. A second callback, CreateFileNameCallback is called to a first filter driver when a filename (that is not a destination filename) is requested by second filter higher than the filename provider.

A destination filename is a filename specified as a target name for a rename operation or hard link creation operation. A hard link refers to aliasing of filenames wherein the same physical bits on a volume have more than one filename. Each of several filenames referring to the same bits on the volume is referred to as a hard link. The destination filename is generated by the filename provider according to the rename or hard link parameters. In one embodiment, the destination filename may be provided in one of two formats: normalized format or opened format. In this embodiment, not all the fragments of the filename are initially parsed from the filename. The Volume and the Share fragments are initially parsed from the filename. Once a pointer to the FIS is returned to the filter driver, the filter driver may request that the FinalComponent, Extension, Stream, and ParentDir fragments be further parsed from the filename.

In one embodiment, destination filenames are not cached in the data structure provided by the filter manager (e.g., the perstream context). The destination filenames are instead cached in an operation specific data structure of the filter manager (e.g., IRP_CTRL). Destination filenames cached for the duration of the rename or hard link creation operation. Once the name callback is utilized, processing proceeds to block 904.

At block 904, the filter manager receives the filename from the filename provider, whether the filename provider is another filter driver lower in altitude from the requesting filter driver or the file system. Processing proceeds to block 905, where processing returns to process 700 and continues at block 705 illustrated in FIG. 7.

Figure 10:
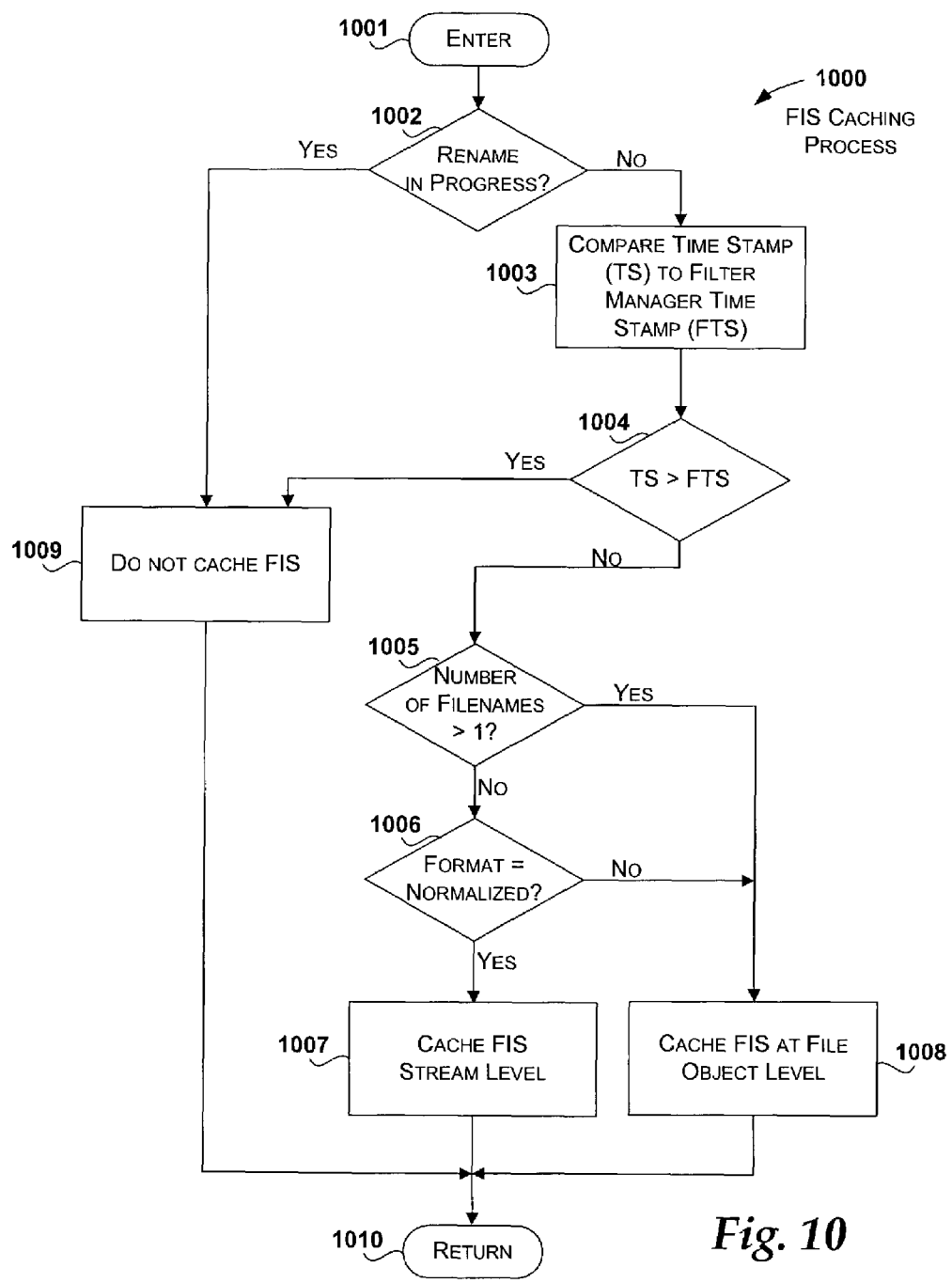
FIG. 10 is a logical flow diagram of an exemplary filename information structure caching process performed in accordance with the present invention.

FIG. 10 is a logical flow diagram of an exemplary filename caching process performed in accordance with the present invention. The process 1000 enters at block 1001 when process 700 shown in FIG. 7 enters block 705. Processing continues at decision block 1002.

At decision block 1002, a determination is made whether a rename is currently in process for the filename received by the filter manager from the name provider. A rename refers to a file rename, a directory rename, or a hard link creation operation. When a rename is initiated that affects a filename received by the filter manager, caching of an FIS is suspended, and the FIS associated with the filename is not cached, and a portion of the cache may be purged. If a rename is in progress, processing moves to block 1009 where the FIS is not cached and the process moves to block 1010.

However, if a rename is not in progress, processing continues to block 1003 where the time stamp (TS) associated with the FIS cached for a particular filename is compared the filter manager time stamp (FTS). The filter manager time stamp corresponds to the time stamp as known by the filter manager. When a rename procedure is initiated, the time stamp (TS) associated with the FIS may change. If the time stamp (TS) changes, it may no longer match the filter manager time stamp (FTS). If a rename commenced before the FIS is cached (e.g., FTS<TS), the FIS is no longer valid for future queries for the filename. However, if the filter manager time stamp matches the time stamp of the FIS (e.g., FTS=TS), the FIS is valid for future queries. Processing continues at decision block 1004.

At decision block 1004, a determination is made, whether according to the results of the comparison, the time stamp of the FIS indicates that the filter manager time stamp (FTS) is less tan as the time stamp (TS) of the FIS. If the time stamp indicates that the FIS is not valid for future queries, the process continues at block 1009 where the FIS is not cached and processing proceeds to block 1010.

However, if the time stamp indicates that the FIS is valid for future queries, the process moves to decision block 1005.

At decision block 1005, a determination is made of the number of filenames associated with a file. As previously discussed, a file stored on the volume may have multiple hard links that each represent a unique filename associated with the file. Accordingly, if the hard links number greater than one, a file has more than one filename. When the filenames associated with a particular file do not number greater than one, processing continues at decision block 1006. However, if the number of filenames associated with a particular file number greater than one, processing moves to block 1008.

At decision block 1006, a determination is made whether the filename received by the filter manager from the filename provider is in a normalized format. When the filename returned to the filter manager is in the normalized format, processing continues at block 1007. However, when the filename returned to the filter manager is in another format such as a short filename or opened filename, processing proceeds to block 1008.

At block 1007, the FIS associated with the filename received by the filter manager is cached at the stream level. An FIS cached at the stream level allows the pointer to the FIS to be returned to any filter driver requesting a filename corresponding to a particular stream. Accordingly, fewer structures are required since a particular FIS may be used for multiple file objects that share the same stream. Processing proceeds to block 1010, where processing returns to process 700 and continues at block 706 of FIG. 7.

At block 1008, the FIS associated with the filename received by the filter manager is cached at the file object level. An FIS cached at the file object level applies to a particular open instance of a file. An FIS cached at the file object level corresponds to a particular file object. Even though the particular file object may share the same stream with a second file object, the FIS stored at the file object level applies to the particular file object and not the second file object. Processing proceeds to block 1010, where processing returns to process 700 and continues at block 706 of FIG. 7.

In one embodiment, the memory space associated with the FIS is unallocated when the FIS is no longer valid. Prior to freeing the memory space, the filter manager examines the reference count associated with the FIS. The memory associated with a particular FIS is not freed until the reference count reaches zero.

Renames

Figure 11:
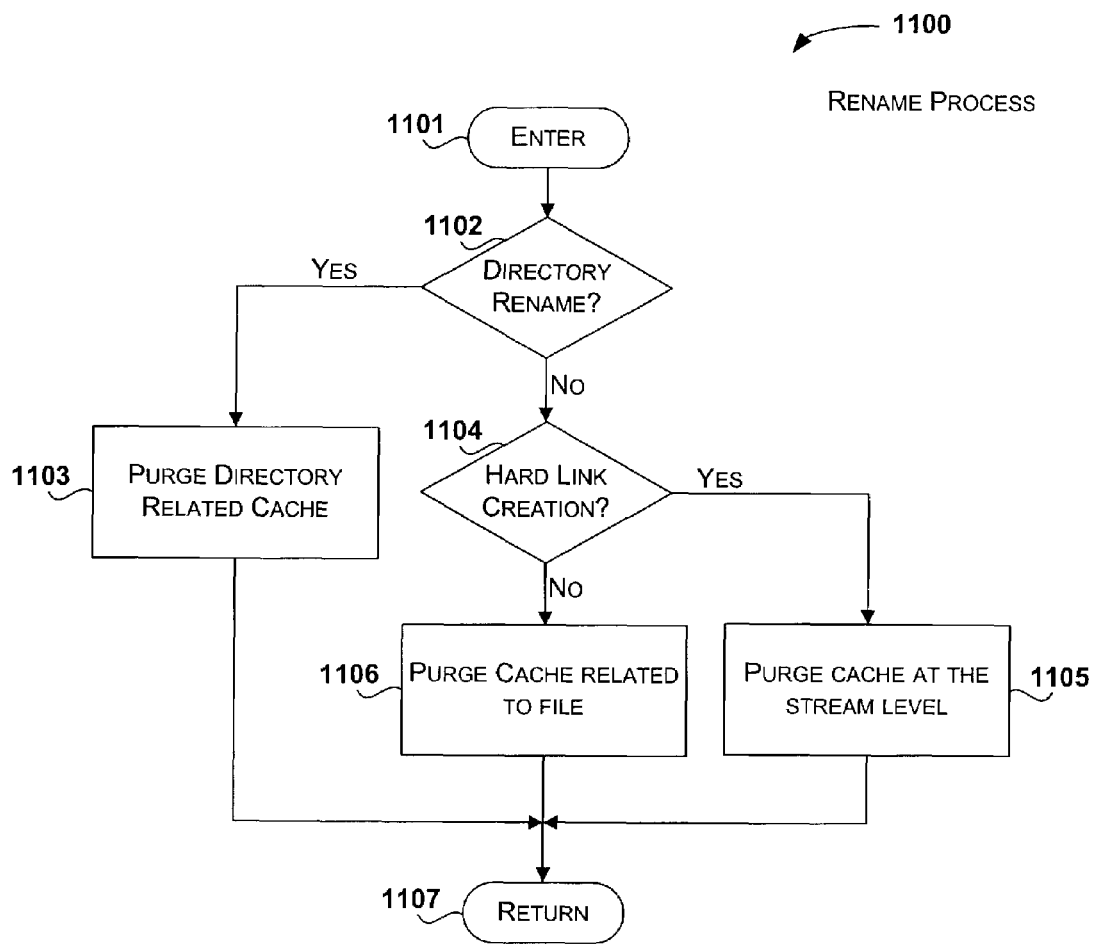
FIG. 11 is a logical flow diagram of an exemplary rename process performed in accordance with the present invention.

FIG. 11 is a logical flow diagram of an exemplary rename process performed in accordance with the present invention. The process 1100 starts at block 1101 where a rename operation has been initiated. Processing continues at decision block 1102.

At decision block 1102, a determination is made whether the rename process currently in progress is a directory rename. In contrast to a rename of a filename, a directory rename changes the filenames of all files associated with the directory. If the rename in progress does not involve renaming a directory, processing continues at decision block 1104. However, if the rename in progress is instituting a name change for a directory, processing moves to block 1103.

At block 1103, in response to the change in the name of a directory, the cache associated with that directory is purged. When referring to the cache, the cache includes each FIS for each format (e.g., normalized, opened, short) of a particular filename. In one embodiment, purging the cache associated with that directory is more efficient than the string comparisons that would be utilized to update the cache to reflect the directory rename. Purging the cache ensures that subsequently generated filenames correctly reflect the directory name change. The cache may then be repopulated as filter drivers query the filter manager for filenames containing the new directory name. Processing continues at block 1107, where the process ends.

At decision block 1104, a determination is made whether the rename process currently in progress corresponds to a hard link creation operation. When a hard link is created, it affects the filename at the stream level. Described differently, an FIS that is cached at the stream level is no longer valid for all open instances of the file when the hard link is created. If the rename process corresponds to a hard link creation operation, processing continues at block 1105.

At block 1105, the cache associated with the hard link creation operation is purged at the stream level. The FIS corresponding to the filename subject to the hard link is no longer stored at the stream level (if originally stored at the stream level, see FIG. 10), but rather at the file object level. An FIS associated with a file having multiple hard links is valid for a particular open instance of the file, but not for all open instances of the file. Processing continues at block 1107, where the process ends.

Alternatively, if the rename process does not correspond to a directory rename or a hard link creation operation, processing continues at block 1106.

At block 1106, the cache associated with a particular filename is purged at both the stream level and the file object level. Accordingly, each FIS for each format of a filename is deleted from the data structures (see FIGS. 4 and 5) associated with the filter manager. Processing continues at block 1107, where the process ends.

Filename Tunneling

In one embodiment, the present invention includes functionality for compensating for filename tunneling capabilities of a file system. Filename tunneling involves the long name/short name pair included in a filename stored within a file system. Support for tunneling is provided by the operating system such that any read/write file system may take advantage of the tunneling functionality. Filename tunneling occurs when either the long name or short name is deleted, but then recreated within a certain time interval. Filename tunneling capabilities enable compatibility with programs that rely on file systems being able to persist file meta-info for a short period of time. This occurs after deletion or renaming and re-introducing a new directory entry with that meta-info (if a create or rename occurs to cause a file of that name to appear again in a short period of time). When a name is removed from a directory (rename or delete), its short/long name pair and certain other attributes such as creation time, are saved in a cache, keyed by the name that was removed. When a name is added to a directory (rename or create), the cache is searched to see if there is information to restore.

Figure 12:
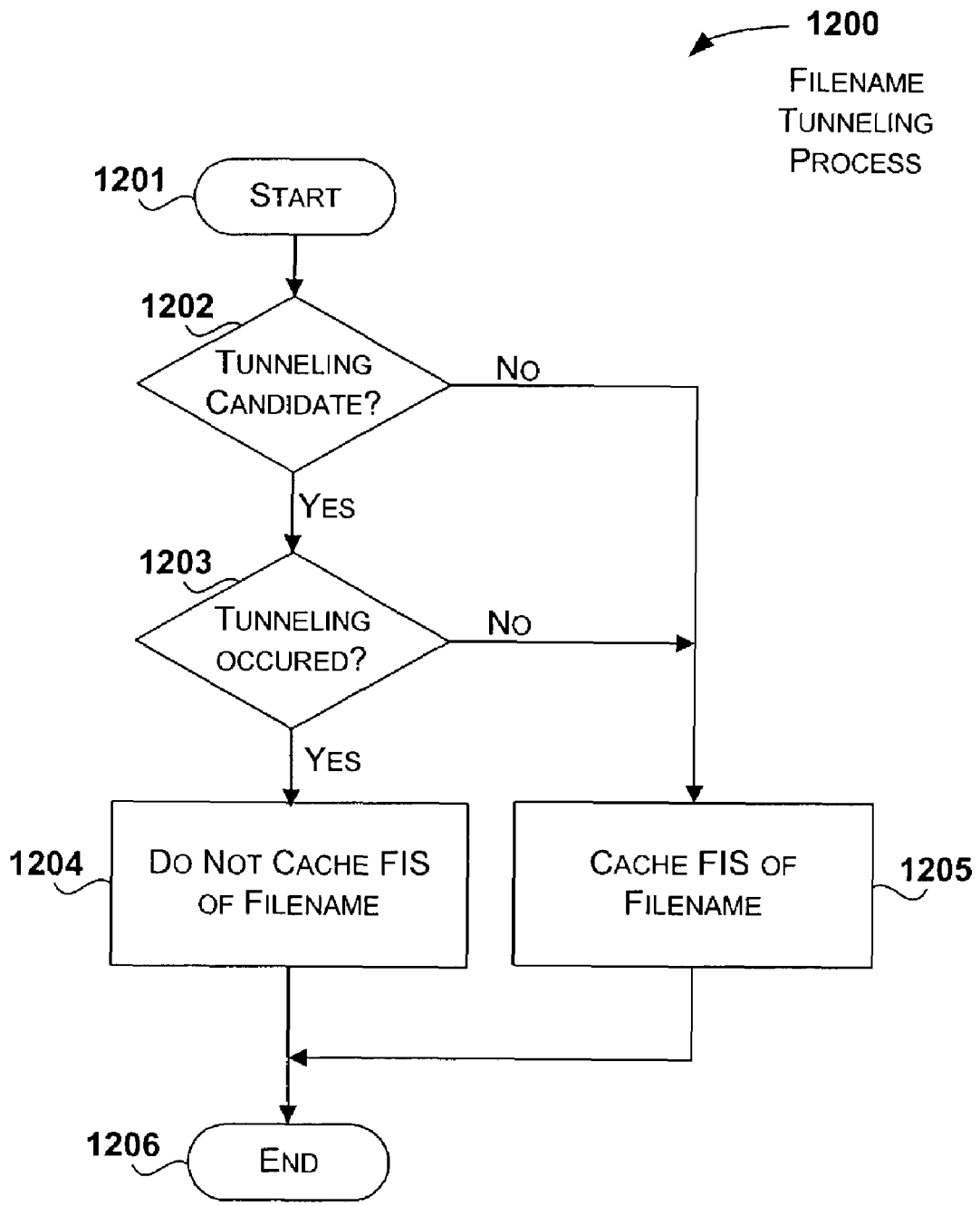
FIG. 12 is a logical flow diagram of an exemplary filename tunneling process performed in accordance with the present invention.

FIG. 12 is a logical flow diagram of an exemplary filename tunneling process performed in accordance with the present invention that runs concurrently with process 700 shown in FIG. 7. The process 1200 enters at start block 1201. Processing continues at decision block 1202.

At decision block 1202, the requesting filter driver recognizes whether the filename it is requesting is a candidate for filename tunneling. A candidate for filename tunneling is a file that contains a portion in 8.3 format. Filename tunneling effects the normalized version of the filename, as short names (i.e., filenames in 8.3 format) are expanded for the normalized version of the filename. Changes to the short filename associated with a file correspondingly change the normalized name. Similarly, when a short filename does not change, the normalized filename may not change. If the filename is not a tunneling candidate, processing proceeds to block 1205 where the FIS corresponding to the filename is cached when a CREATE operation for the filename is completed successfully. However, if the filename is a tunneling candidate, processing continues to decision block 1203.

At decision block 1203, a determination is made whether tunneling occurred for a filename that is a filename candidate. If no tunneling occurred, processing moves to block 1205, where the FIS corresponding to the filename is cached when a CREATE operation for the filename is completed successfully. However, if filename tunneling was utilized during creation of the filename, processing continues at block 1204.

At block 1204, the FIS associated with the created filename is not cached within the data structures provided by the filter manager. In one embodiment, an error message is returned to the requesting filter driver, notifying the filter driver of the failure to cache the FIS. Processing continues at block 1206, where the process ends.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for a filter manager to manage filenames for file system filter drivers, the method comprising:
   receiving, at a filter manager, an input/output request packet from an application:
   sending, from the filter manager, a notification to at least one filter driver that indicates that the filter manager has received the input/output request packet;
   receiving, at the filter manager, a filename request from a first filter driver for a filename within a specified format, wherein the filename request comprises a file object corresponding to an open instance of a file identified by the filename;
   sending, from the filter manager, a call to a filename provider to generate a filename corresponding to the filename request, wherein the filename provider is determined based on the first filter driver;
   locating a filename information structure corresponding to the filename request, wherein the filename information structure is located based on the file object and the filename provider;
   caching the located filename information structure corresponding to the filename received from the filename provider; and
   sending, from the filter manager to the first filter driver, a pointer that points to the located filename information structure.

2. The method of claim 1, further comprising determining whether a filename information structure that satisfies the filename request has been previously cached prior to calling the filename provider to generate the filename.

3. The method of claim 1, further comprising updating a reference count associated with the located filename information structure when the pointer is returned to the first filter driver, such that the located filename information structure is maintained while utilized by the first filter driver.

4. The method of claim 1, further comprising updating a time stamp associated with the located filename information structure when the pointer is returned to the first filter driver, such that the validity of the filename information structure is determined prior to caching the located file information structure.

5. The method of claim 1, wherein receiving the filename request further comprises receiving a filename request that specifies an identifier for the first filter driver, and receiving a format for the filename.

6. The method of claim 5, wherein the format for the filename includes at least one of normalized, opened, and short.

7. The method of claim 1, wherein calling the filename provider further comprises calling a second filter driver lower in altitude from the first filter driver when the second filter driver is operating as the filename provider.

8. The method of claim 1, further comprising determining whether a rename procedure is in progress and purging an appropriate portion of a cache of filename information structures when the rename procedure changes at least a portion of the filename.

9. The method of claim 1, wherein the located filename information structure is cached at one of a stream level and a file object level.

10. The method of claim 1, further comprising:
    determining whether a rename is in progress;
    comparing a time at which the rename is finished to the time at which the generated filename information structure is created; and
    avoiding returning the pointer to the first filter driver when the rename finishes later in time when compared to the time at which the generated filename information structure is created.

11. The method of claim 1, further comprising compensating for filename tunneling by determining when filename tunneling has occurred and avoiding caching the generated filename information structure when filename tunneling has occurred.

12. A computer-readable storage medium having computer-executable components, comprising:
    a filter manager for managing filename requests by a first filter driver for a file system, the filter manager being configured to:
      receive an input/output request packet from an application:
      send a notification to at least one filter driver that indicates the receipt of the input/output packet;
      receive a filename request from the first filter driver for a filename with a specified format, wherein the filename request comprises a file object corresponding to an open instance of a file identified by the filename;
      determine whether a filename information structure satisfying the filename request has been previously cached, and returning a pointer to the first filter driver that points to the filename information structure when the filename information structure has been previously cached; and
      when the filename information structure has not been previously cached:
        call a filename provider to generate a filename corresponding to the filename request, wherein the filename provider is determined based on the first filter driver;
        locate a filename information structure corresponding to the filename request, wherein the filename information structure is located based on the file object and the filename provider;

cache the located filename information structure correspond to the filename received from the filename provider; and return a pointer to the first component that points to the located filename information structure.

13. The computer-readable storage medium of claim 12, wherein the filter manager is arranged between the file system and external applications associated with an operating system, such that the filter manager receives and handles input/output requests for the file system in addition to the filename requests by the first filter driver.

14. The computer-readable storage medium of claim 12, wherein the filter manager includes filename caching data structures within which filename information structures are cached, wherein the filename caching data structures are organized according to the format of the filenames corresponding to the filename information structures.

15. The computer-readable storage medium of claim 12, wherein the format of the filenames is at least one of normalized, opened, or short.

16. A computer-readable storage medium having computer-executable instructions for a filter manager to manage filenames for file system filter drivers, the instructions comprising:

receiving, at a filter manager, an input/output request packet from an application;

sending, from the filter manager, a notification to at least one filter driver that indicates that the filter manager has received the input/output request packet;

receiving, on the filter manager, a filename request from a first filter driver for a filename within a specified format, wherein the filename request comprises a file object corresponding to an open instance of a file identified by the filename;

determining whether a filename information structure satisfying the filename request has been previously cached, and returning a pointer to the first filter driver that points to the filename information structure when the filename information structure has been previously cached; and when the filename information structure has not been previously cached:

sending, from the filter manager, a call to a filename provider to generate a filename corresponding to the filename request when a filename information structure has not been previously cached, wherein the filename provider is determined based on the first filter driver;

locating a filename information structure corresponding to the filename request, wherein the filename information structure is located based on the file object and the filename provider;

caching the located filename information structure correspond to the filename received from the filename provider; and sending, from the filter manager to the first filter driver, a pointer that points to the located filename information structure.

17. The computer-readable storage medium of claim 16, further comprising updating a reference count associated with the located filename information structure when the pointer is returned to the first filter driver, such that the located filename information structure is maintained while utilized by the first filter driver.

18. The computer-readable storage medium of claim 16, further comprising updating a time stamp associated with the located filename information structure when the pointer is returned to the first filter driver, such that the validity of the filename information structure is determined prior to caching the located file information structure.

19. The computer-readable storage medium of claim 16, wherein receiving the filename request further comprises receiving a filename request that specifies an identifier for the first filter driver, and receiving a format for the filename.

20. The computer-readable storage medium of claim 19, wherein the format for the filename includes at least one of normalized, opened, and short.

21. The computer-readable storage medium of claim 16, further comprising determining whether a rename procedure is in progress and purging an appropriate portion of a cache of filename information structures when the rename procedure changes at least a portion of the filename.

22. The computer-readable storage medium of claim 16, wherein the generated filename information structure is cached at one of a stream level and a file object level.

* * * * *